United States Patent
Han et al.

(10) Patent No.: US 8,711,463 B2
(45) Date of Patent: Apr. 29, 2014

(54) LIGHT MODULATORS AND OPTICAL APPARATUSES INCLUDING THE SAME

(75) Inventors: Seung-hoon Han, Seoul (KR); Yong-hwa Park, Yongin-si (KR); Chang-gyun Shin, Anyang-si (KR); Hong-seok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 13/337,956

(22) Filed: Dec. 27, 2011

(65) Prior Publication Data

US 2012/0170097 A1    Jul. 5, 2012

(30) Foreign Application Priority Data

Dec. 30, 2010  (KR) .................. 10-2010-0139356

(51) Int. Cl.
*G02F 1/01*    (2006.01)

(52) U.S. Cl.
USPC ........................................ 359/238

(58) Field of Classification Search
USPC ......... 359/238, 244, 262, 263, 299, 321, 578, 359/585, 586
See application file for complete search history.

(56) References Cited

U.S. PATENT DOCUMENTS

| 7,773,228 | B1 | 8/2010 | Hollingsworth et al. | |
|---|---|---|---|---|
| 8,045,107 | B2 * | 10/2011 | Tang et al. | 349/117 |

FOREIGN PATENT DOCUMENTS

| JP | 2006-517674 | 7/2006 |
|---|---|---|
| JP | 2006-349532 | 12/2006 |
| JP | 2007-501391 | 1/2007 |
| KR | 10-2006-0087314 | 8/2006 |
| KR | 10-2006-0130543 | 12/2006 |
| KR | 10-2007-0117634 | 12/2007 |
| KR | 10-2010-0002960 | 1/2010 |
| WO | WO 2004/059347 A2 | 7/2004 |
| WO | WO 2005/017570 A2 | 2/2005 |

OTHER PUBLICATIONS

Teperik, Tatiana V., FJ García De Abajo, A. G. Borisov, M. Abdelsalam, P. N. Bartlett, Y. Sugawara, and J. J. Baumberg. "Omnidirectional absorption in nanostructured metal sufaces." *Nature photonics* 2, No. 5 (May 2008): pp. 299-301.

* cited by examiner

*Primary Examiner* — Tuyen Tra
(74) *Attorney, Agent, or Firm* — NSIP Law

(57) ABSTRACT

Provided are examples of light modulators and optical apparatuses that may include the light modulators. A light modulator may include a plasmonic nano-antenna and an element for changing plasmon resonance characteristics of the plasmonic nano-antenna. The plasmon resonance characteristics of the plasmonic nano-antenna may be changed due to a change in refractive index of the element, and thus light may be modulated.

39 Claims, 9 Drawing Sheets

LIGHT MODULATORS AND OPTICAL APPARATUSES INCLUDING THE SAME

CROSS-REFERENCE TO RELATED APPLICATION(S)

This application claims the benefit under 35 U.S.C. §119 (a) of Korean Patent Application No. 10-2010-0139356, filed on Dec. 30, 2010, in the Korean Intellectual Property Office, the entire disclosure of which is incorporated herein by reference for all purposes.

BACKGROUND

1. Field

The following description relates to light modulators and optical apparatuses including the same.

2. Description of the Related Art

General light modulators control the flow or characteristics of light such as the direction, a degree of transmission or reflection, and the like. Light modulators typically use a mechanical motion of a light blocking or changing element, liquid crystals, a structure of a microelectromechanical system (MEMS), and the like, to control light. These light modulators typically have a long response time of several microseconds (μs) due to their driving methods (mechanisms), and thus, they have a low operation speed.

SUMMARY

In one general aspect, there is provided a light modulator including a plasmonic nano-antenna, a refractive index change layer that is disposed adjacent to the plasmonic nano-antenna, and a refractive index changing unit configured to change a refractive index of the refractive index change layer, wherein, in response to the refractive index changing unit changing the refractive index of the refractive index change layer, plasmon resonance characteristics of the plasmonic nano-antenna are changed.

The refractive index change layer may comprise a material that has a refractive index that is capable of being changed by an electrical signal.

The refractive index change layer may comprise an electrooptic material.

The refractive index change layer may comprise a transparent conductive material.

The refractive index changing unit may comprise first and second electrodes that are spaced apart from each other and intervening the refractive index change layer, and a voltage applying unit configured to apply a voltage between the first and second electrodes.

The refractive index change layer may be in contact with the first electrode, and the plasmonic nano-antenna may be disposed between the refractive index change layer and the second electrode.

At least a portion of the refractive index change layer may be used as one of the first or second electrodes.

At least a portion of the refractive index change layer may be used as the first electrode, and the plasmonic nano-antenna may be disposed between the refractive index change layer and the second electrode.

The light modulator may further comprise a dielectric layer that is disposed between the refractive index change layer and the plasmonic nano-antenna.

At least a portion of the refractive index change layer may be used as the first electrode, the second electrode may be disposed at a side of the refractive index change layer and the second electrode is spaced apart from the refractive index change layer, and the plasmonic nano-antenna may be disposed at the other side of the refractive index change layer.

The light modulator may further comprise a dielectric layer that is disposed between the refractive index change layer and the second electrode.

At least a portion of the plasmonic nano-antenna may be used as one of the first or second electrodes.

At least a portion of the plasmonic nano-antenna may be used as the first electrode, and the refractive index change layer may be disposed between the plasmonic nano-antenna and the second electrode.

The plasmonic nano-antenna may comprise a metallic layer pattern, and the metallic layer pattern may contact a non-metallic layer.

The non-metallic layer may comprise a dielectric layer.

The non-metallic layer may be the refractive index change layer, or a separate layer other than the refractive index change layer.

The metallic layer pattern may comprise a shape of at least one of a circular disc, a cross, a cone, a sphere, a hemisphere, a rice grain, an oval disc, and a rod.

A lower surface of the metallic layer pattern may comprise a concave structure.

The lower surface of the metallic layer pattern may be concaved in the shape of a hemisphere or a pseudo hemisphere.

A thickness of the metallic layer pattern may be equal to or less than $\lambda/5$, where $\lambda$ is a resonance wavelength of the light modulator.

A plurality of metallic layer patterns may be regularly arranged.

The plurality of metallic layer patterns may be spaced apart from each other such that adjacent metallic layer patters are spaced apart by a distance d.

The plurality of metallic layer patterns may contact each other.

A distance between centers of two neighboring metallic layer patterns may be equal to or less than $\lambda/2$, where $\lambda$ is a resonance wavelength of the light modulator.

The light modulator may be one of a reflective type, a transmissive type, or a transflective type.

In another aspect, there is provided an optical apparatus comprising the light modulator.

The optical apparatus may be a camera.

The camera may be a three-dimensional (3D) camera that uses the light modulator as a shutter.

The optical apparatus may be a display device.

The display device may use the light modulator as a color pixel.

The display device may be one of a reflective type, a transmissive type, or a transflective type.

In another aspect, there is provided a light modulator including a nanoparticle layer in which a plurality of nanoparticles are arranged, a metallic layer disposed on the nanoparticle layer and that has an uneven structure on a lower surface, a refractive index change layer that is disposed on the metallic layer, and a refractive index changing unit configured to change a refractive index of the refractive index change layer.

The metallic layer may comprise a unit structure corresponding to one of the nanoparticles, and a plurality of the unit structures may be continuously arranged.

A distance between centers of two neighboring unit structures may be equal to or less than $\lambda/2$, where $\lambda$ is a resonance wavelength of the light modulator.

A thickness of each of the plurality of unit structures may be equal to or less than λ/5, where λ is a resonance wavelength of the light modulator.

The refractive index changing unit may comprise first and second electrodes that are spaced apart from each other and intervening the refractive index change layer, and a voltage applying configured to apply a voltage between the first and second electrodes.

The metallic layer may be one of the first and second electrodes.

An optical apparatus may include the light modulator.

Other features and aspects may be apparent from the following detailed description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

A light modulator as described herein may be used in various optical apparatuses such as a display device, a camera, a television, a projector, a display of a terminal, and the like. For example, the light modulator may be used as a color pixel for modulating colors of a display device.

Figure 1:
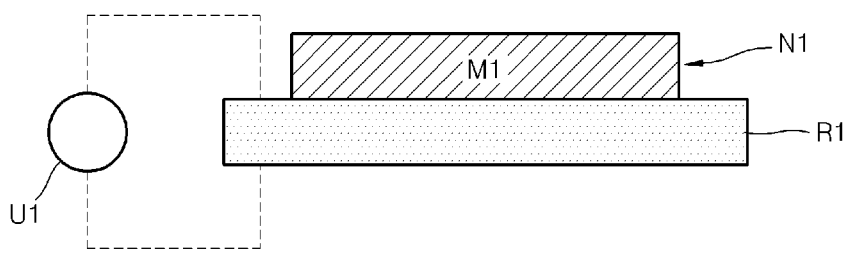
FIG. 1 is a diagram illustrating an example of a light modulator.

FIG. 1 illustrates an example of a light modulator.

Referring to FIG. 1, the light modulator includes a plasmonic nano-antenna N1 and a refractive index change layer R1 disposed adjacent to the plasmonic nano-antenna N1. The plasmonic nano-antenna N1 may convert light (incident light including visible and invisible electromagnetic waves) of a certain wavelength (or a certain frequency) into a form of localized surface plasmon resonance to capture its energy. The plasmonic nano-antenna N1 may refer to a nano-structured antenna regarding light. Light of a certain wavelength band may be absorbed by the plasmonic nano-antenna N1.

As an example, the plasmonic nano-antenna N1 may include a metallic layer pattern M1. The metallic layer pattern M1 may contact a non-metallic layer (e.g., a dielectric layer). Plasmon resonance may occur at an interface between the metallic layer pattern M1 and the non-metallic layer. In this example, the non-metallic layer is the refractive index change layer R1, which will be described below. As another example, the refractive index change layer R1 may be a separate layer that is different from the refractive index change layer R1. For convenience of description, it is assumed hereinafter that the metallic layer pattern M1 is the plasmonic nano-antenna N1.

The refractive index change layer R1 may contact or be disposed adjacent to the plasmonic nano-antenna N1. For example, the refractive index change layer R1 may be a layer of a material that has a refractive index that may be changed by an electrical signal. Here, the change in refractive index may include a change in absorptance (light absorptance). Accordingly, the refractive index change layer R1 may be a layer that has a refractive index and an absorptance (light absorptance) that are variable. For example, the refractive index change layer R1 may include an electrooptic material. As described herein, the electrooptic material may include a crystalline material such as potassium tantalate niobate (KTN), $LiNbO_3$, lead zirconate titanate (PZT), and/or one of various polymers having electrooptic characteristics. As another example, the refractive index change layer R1 may include a transparent conductive material. For example, the transparent conductive material may include indium tin oxide (ITO), a ZnO-based material such as indium zinc oxide (IZO), aluminium zinc oxide (AZO), gallium zinc oxide (GZO), and the like. The transparent conductive material may also have a refractive index that may be changed by an electrical signal. As another example, the refractive index change layer R1 may include a combination of materials, for example, an electrooptic material, a transparent conductive material, and the like.

A refractive index changing unit U1 may be used to change a refractive index of the refractive index change layer R1. If the refractive index change layer R1 is capable of being changed by an electrical signal, the refractive index changing unit U1 may include an element (e.g., a voltage generator) for applying an electrical signal to the refractive index change layer R1. In this example, a first electrode (not shown) connected to the refractive index changing unit U1 may be disposed at a side of the refractive index change layer R1, and a second electrode (not shown) connected to the refractive index changing unit U1 may be disposed at another side of the refractive index change layer R1. As another example, if the refractive index change layer R1 is a conductive material layer, the refractive index change layer R1 itself (or a portion thereof) may be used as one of the first and second electrodes. If the refractive index of the refractive index change layer R1 is changed using an electrical signal, the refractive index may be changed at a very high speed.

If the refractive index of the refractive index change layer R1 is changed, plasmon resonance characteristics of the plasmonic nano-antenna N1 may be changed. For example, due to the change in refractive index of the refractive index change layer R1, a resonance wavelength, a resonance wavelength width, and/or a resonance depth of the plasmonic nano-antenna N1 may be changed. In this example, the plasmonic nano-antenna N1 may capture light of a certain wavelength (or a frequency) in a form of localized surface plasmon resonance. In this example, energy may be concentrated on a small region, for example, several nanometers (nm) to several tens of nm of a surface of the plasmonic nano-antenna N1 or around the surface. The plasmon resonance characteristics of the plasmonic nano-antenna N1 may be sensitively changed (modulated) due to the change in refractive index of the refractive index change layer R1. Thus, even when a refractive index change material (e.g., an electrooptic medium) having a small volume is used, a light modulator driven by a low power at a high speed, and having a wide modulation range may be realized.

If plasmon resonance is not used and only an electrooptic method is applied, an electrooptic medium having a large volume is typically required and a driving voltage is increased. However, as described herein, the resonance characteristics of the plasmonic nano-antenna N1 may be changed (modulated) using a change in refractive index of a refractive index change material (e.g., an electrooptic medium). Accordingly, a thin-film-type light modulator driven by a low power at a high speed, and having a wide modulation range and a small volume may be realized. In addition, the resonance wavelength, the resonance wavelength width, resonance polarization characteristics, a resonance angle, and/or various reflection/absorption/transmission characteristics of the plasmonic nano-antenna N1 may vary according to a shape/structure and an arrangement of the plasmonic nano-antenna N1. Accordingly, a light modulator having desired characteristics may be manufactured by controlling the shape/structure and the arrangement of the plasmonic nano-antenna N1.

Although not shown in FIG. 1, a dielectric layer may be disposed on at least one of the lower and upper surfaces of the refractive index change layer R1. If the dielectric layer is disposed between the refractive index change layer R1 and the plasmonic nano-antenna N1, the refractive index change layer R1 and the plasmonic nano-antenna N1 may be slightly spaced apart from each other. However, even in this example, because the refractive index change layer R1 and the plasmonic nano-antenna N1 may be relatively close to each other, the plasmon resonance characteristics of the plasmonic nano-antenna N1 may be changed due to the change in refractive index of the refractive index change layer R1.

Figure 2:
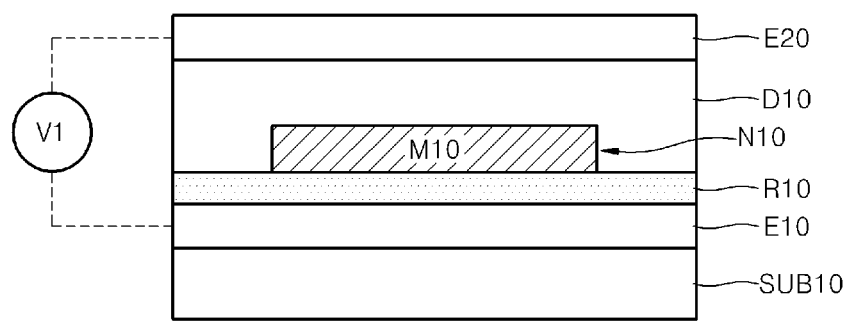
FIGS. 2 through 4 are diagrams illustrating additional examples of light modulators.
Figure 3:
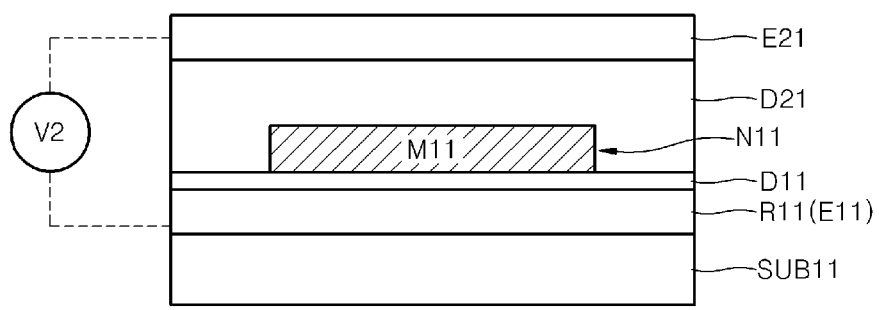
Figure 4:
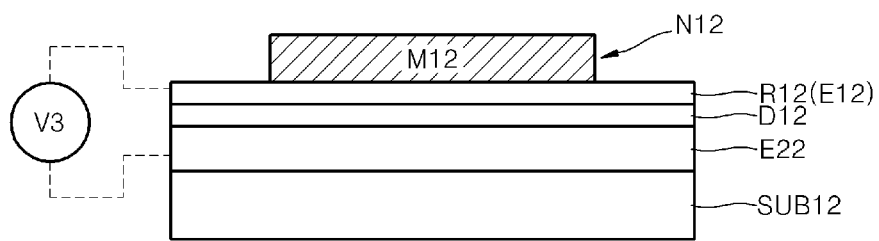

FIGS. 2 through 4 illustrate additional examples of light modulators.

Referring to FIG. 2, a first electrode E10 is disposed on a substrate SUB10. For example, the first electrode E10 may be a transparent electrode, an opaque electrode, a translucent electrode, and the like. A refractive index change layer R10 is disposed on the first electrode E10. The refractive index change layer R10 may be, for example, a non-conductive layer that includes an electrooptic material. As another example, the refractive index change layer R10 may be a conductive layer that includes a transparent conductive material. A plasmonic nano-antenna N10 is disposed on the refractive index change layer R10. For example, the plasmonic nano-antenna N10 may include a metallic layer pattern M10.

A predetermined adhesive layer or a seed layer (not shown) may be disposed between the metallic layer pattern M10 and the refractive index change layer R10. The adhesive layer may be, for example, a chromium (Cr) layer. A dielectric layer D10 covers the metallic layer pattern M10 of the plasmonic nano-antenna N10. In this example, the metallic layer pattern M10 contacts the dielectric layer D10. In this regard, the metallic layer pattern M10 itself may be regarded as the plasmonic nano-antenna N10. A second electrode E20 is disposed on the dielectric layer D10. The second electrode E20 may be a transparent electrode. For example, the second electrode E20 may be formed of a transparent conductive oxide. A voltage applying unit V1 is connected to the first and second electrodes E10 and E20. The voltage applying unit V1 may apply a voltage between the first and second electrodes E10 and E20 to apply an electric field to the refractive index change layer R10. A permittivity of the refractive index change layer R10 may be changed by the electric field. As a result, a refractive index of the refractive index change layer R10 may be changed.

Although not shown in FIG. 2, an additional dielectric layer may be disposed between the first electrode E10 and the refractive index change layer R10 and/or between the refractive index change layer R10 and the plasmonic nano-antenna N10 (i.e., the metallic layer pattern M10). In the example in which the additional dielectric layer is disposed between the refractive index change layer R10 and the plasmonic nano-antenna N10 (i.e., the metallic layer pattern M10), a thickness of the additional dielectric layer may be, for example, equal to or less than several tens of nm.

A type of the light modulator illustrated in FIG. 2 may vary according to a transparency (or an opacity) of the first electrode E10. For example, if the first electrode E10 is a transparent electrode, the light modulator may act as a transmissive or transflective device. If the first electrode E10 is an opaque electrode, the light modulator may act as a reflective device. If the first electrode E10 is a translucent electrode, the light modulator may act as a transflective device.

FIGS. 3 and 4 illustrate examples in which refractive index change layers R11 and R12 themselves (or portions thereof) are used as first electrodes E11 and E12.

Referring to FIG. 3, the refractive index change layer R11 is disposed on a substrate SUB11. In this example, the refractive index change layer R11 may be a conductive layer. For example, the refractive index change layer R11 may be a layer of a transparent conductive material such as an oxide, e.g., ITO, IZO, AZO, GZO, ZnO, and the like. In this case, the refractive index change layer R11 itself (or a portion thereof) may be used as the first electrode E11. A first dielectric layer D11 is disposed on the refractive index change layer R11. A metallic layer pattern M11 is disposed on the first dielectric layer D11, and a second dielectric layer D21 is disposed so as to cover the metallic layer pattern M11. The metallic layer pattern M11 contacting the first and second dielectric layers D11 and D21 may be referred to as a plasmonic nano-antenna N11.

A second electrode E21 is disposed on the second dielectric layer D21. A voltage applying unit V2 is connected to the refractive index change layer R11 used as the first electrode E11, and the second electrode E21. The voltage applying unit V2 may apply a predetermined voltage between the refractive index change layer R11 and the second electrode E21 to apply an electric field to the refractive index change layer R11. For example, a negative (−) voltage may be applied to the refractive index change layer R11, and a positive (+) voltage may be applied to the second electrode E21. In this example, negative (−) charges may be concentrated on an upper portion of the refractive index change layer R11, and thus, a refractive index of the upper portion may be changed. Due to the change in refractive index of the refractive index change layer R11, plasmon resonance characteristics of the plasmonic nano-antenna N11 may be changed.

For example, a thickness of the first dielectric layer D11 disposed between the refractive index change layer R11 and the plasmonic nano-antenna N11 may be equal to or less than several tens of nm. As an example, the thickness of the first dielectric layer D11 may be equal to or less than about 80 nm. If the first dielectric layer D11 has a relatively small thickness, the refractive index change layer R11 and the plasmonic nano-antenna N11 may be relatively close to each other, and the plasmon resonance characteristics of the plasmonic nano-antenna N11 may be easily changed due to the change in refractive index of the refractive index change layer R11.

Because the refractive index change layer R11 used as the first electrode E11 may be a transparent conductive material layer, the light modulator illustrated in FIG. 3 may act as a transmissive or transflective light modulator.

Referring to FIG. 4, a second electrode E22 is disposed on a substrate SUB12, and a dielectric layer D12 is disposed on the second electrode E22. The refractive index change layer R12 is disposed on the dielectric layer D12. Like the refractive index change layer R11 illustrated in FIG. 3, the refractive index change layer R12 may be a conductive layer. For example, the refractive index change layer R12 may be a layer of a transparent conductive material including an oxide, e.g., ITO, IZO, AZO, GZO, and/or ZnO. In this example, the refractive index change layer R12 may be used as the first electrode E12. For example, the refractive index change layer R12 may be an electrically conductive layer, but may be an 'optically dielectric layer'. In other words, the refractive index change layer R12 may function as a dielectric layer with respect to a frequency of light. As an example a thickness of the refractive index change layer R12 may be equal to or less than 100 nm.

A metallic layer pattern M12 is disposed on the refractive index change layer R12. Because the refractive index change layer R12 may be an 'optically dielectric layer', the metallic layer pattern M12 may contact a dielectric layer (i.e., the refractive index change layer R12). The metallic layer pattern M12 may be referred to as a plasmonic nano-antenna N12. Although not shown in FIG. 4, an additional dielectric layer may be disposed on the refractive index change layer R12 to cover the plasmonic nano-antenna N12. A voltage applying unit V3 is connected to the refractive index change layer R12 used as the first electrode E12, and the second electrode E22. The voltage applying unit V3 may apply a voltage between the refractive index change layer R12 and the second electrode E22 to apply an electric field to the refractive index change layer R12. For example, a negative (−) voltage may be applied to the refractive index change layer R12, and a positive (+) voltage may be applied to the second electrode E22. In this example, negative (−) charges may be concentrated on a lower portion of the refractive index change layer R12, and thus, a refractive index of the lower portion may be changed. Due to the change in refractive index of the refractive index change layer R12, plasmon resonance characteristics of the plasmonic nano-antenna N12 may be changed.

A type of the light modulator illustrated in FIG. 4 may vary according to a transparency (or an opacity) of the second electrode E22. If the second electrode E22 is a transparent electrode, the light modulator may act as a transmissive or transflective device. If the second electrode E22 is an opaque electrode, the light modulator may act as a reflective device. If the second electrode E22 is a translucent electrode, the light modulator may act as a transflective device.

Figure 5:
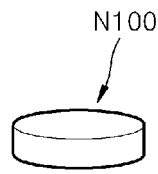
FIG. 5 is a diagram illustrating an example of a plasmonic nano-antenna used in a light modulator.

FIG. 5 illustrates a plasmonic nano-antenna N100 used in a light modulator. In FIG. 5, the plasmonic nano-antenna N100 is an example of a shape of the metallic layer pattern M1, M10, M11, and M12 illustrated in FIGS. 1, 2, 3, and 4.

Referring to FIG. 5, the plasmonic nano-antenna N100 has a circular disc shape. The plasmonic nano-antenna N100 may form an array as illustrated in FIG. 6.

Figure 6:
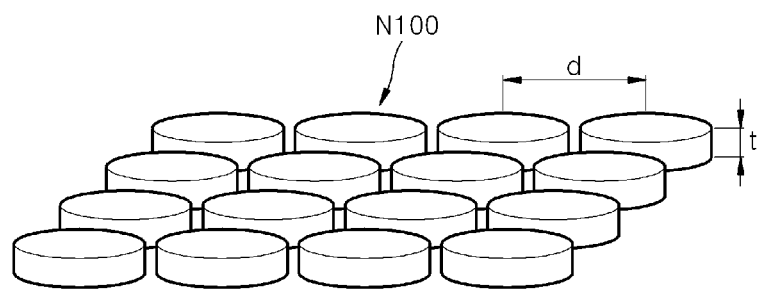
FIGS. 6 through 8 are diagrams illustrating examples of arrays of plasmonic nano-antennas used in a light modulator.

Referring to FIG. 6, a plurality of plasmonic nano-antennas N100 may be regularly arranged. In this example, a distance d between the centers of two neighboring plasmonic nano-antennas N100 may be equal to or less than $\lambda/2$, equal to or less than $\lambda/3$, and the like. In this example, $\lambda$ is a resonance wavelength of a light modulator, i.e., a resonance wavelength of the plasmonic nano-antenna N100. For example, a thickness t of the plasmonic nano-antennas N100 may be equal to or less than $\lambda/5$, equal to or less than $\lambda/10$, equal to or greater than $\lambda/20$, and the like. If the distance d between the centers of two neighboring plasmonic nano-antennas N100 satisfies an above condition, incident light may be transmitted or reflected without generating additional diffracted light. Also, if the thickness t of the plasmonic nano-antennas N100 satisfies an above condition, the number of resonance wavelengths (absorption wavelengths) may not be excessively increased to equal to or greater than two.

The example of the array structure illustrated in FIG. 6, in which the plasmonic nano-antennas N100 are regularly arranged, may operate as one single medium or one effective medium.

Figure 7:
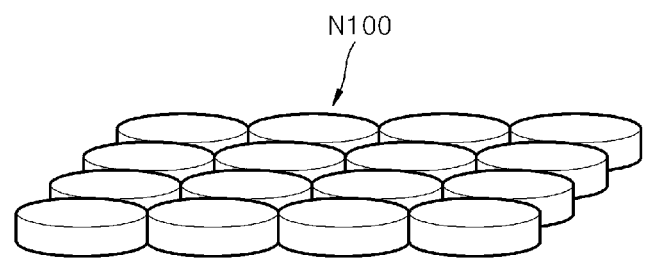

An arrangement of the plasmonic nano-antennas N100 is not restricted to the example illustrated in FIG. 6, and may be variously changed. For example, although the plasmonic nano-antennas N100 are spaced apart from each other at predetermined intervals in FIG. 6, the plasmonic nano-antennas N100 may be arranged to contact each other as illustrated in FIG. 7. As another example, the plasmonic nano-antennas N100 may have a closely packed structure as illustrated in FIG. 8.

Figure 8:
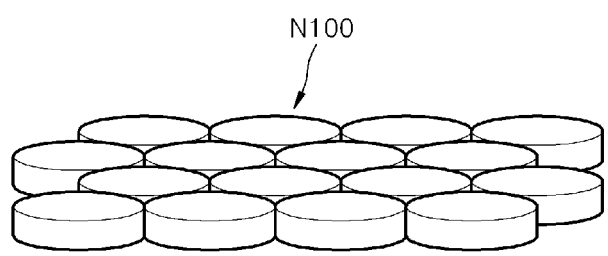

A structure (an array structure) of the plasmonic nano-antennas N100 that are regularly arranged as illustrated in FIG. 6, 7, or 8 may form one unit structure (hereinafter referred to as a unit array structure). The unit array structures may be repeatedly arranged as illustrated in FIG. 9.

Figure 9:
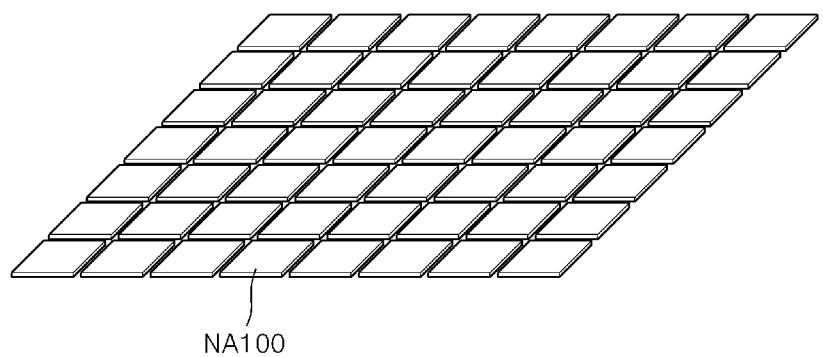
FIG. 9 is a diagram illustrating an example of regularly arranged unit array structures of plasmonic nano-antennas used in a light modulator.
Figure 10:
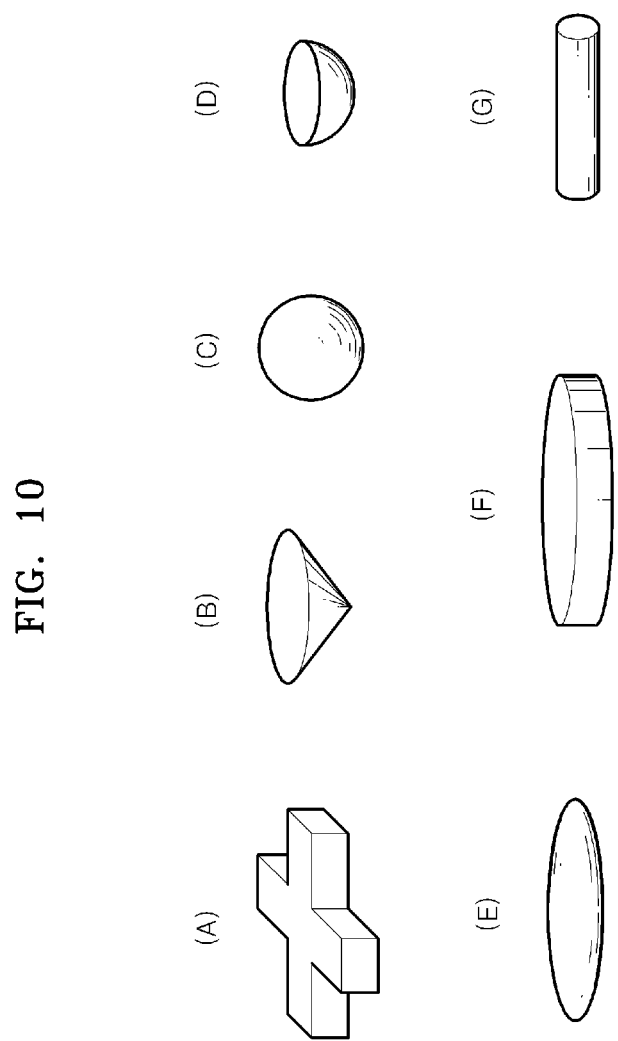
FIGS. 10A through 10G are diagrams illustrating examples of various plasmonic nano-antennas used in a light modulator.

In FIG. 9, a reference numeral NA100 refers to a unit array structure. That is, the unit array structure NA100 may be one of the array structures illustrated in the examples of FIGS. 6 through 8. The structure illustrated in FIG. 9 may operate as a spatial light modulator. For example, one or more of the unit array structures NA100 in FIG. 9 may be applied to one pixel.

Meanwhile, the shape of the plasmonic nano-antenna N100 is not limited to the examples illustrated in FIGS. 5 through 8, and may be variously changed. For example, the plasmonic nano-antenna N100 may have one of various shapes illustrated in FIGS. 10A through 10G.

Referring to FIGS. 10A through 10G, the plasmonic nano-antenna N100 may have one of various shapes, for example, a cross (FIG. 10A), a cone (FIG. 10B), a sphere (FIG. 10C), a hemisphere (FIG. 10D), a rice grain (FIG. 10E), an oval disc (FIG. 10F), a rod (FIG. 10G), a combination thereof, and the like. Here, the cross (FIG. 10A), the cone (FIG. 10B), the sphere (FIG. 10C), and the hemisphere (FIG. 10D) are symmetrical shapes like the circular disc illustrated in FIG. 5. Meanwhile, the rice grain (FIG. 10E), the oval disc (FIG. 10F), and the rod (FIG. 10G) are shapes that are elongated in a direction.

The plasmonic nano-antenna N100 may have a multilayer structure. For example, if a shape of the plasmonic nano-antenna N100 is the sphere (FIG. 10C), the plasmonic nano-antenna N100 may include a core portion and at least one shell portion. In addition, plasmonic nano-antennas that have two or more different shapes may form one unit and a plurality of the units may be regularly (periodically) arranged.

A resonance wavelength, a resonance wavelength width, resonance polarization characteristics, a resonance angle, and/or reflection/absorption/transmission characteristics of the plasmonic nano-antenna N100 may vary based on the shape and the arrangement of the plasmonic nano-antennas N100. Accordingly, a light modulator having desired characteristics may be easily manufactured by controlling the shape and the arrangement of the plasmonic nano-antennas N100.

Figure 11:
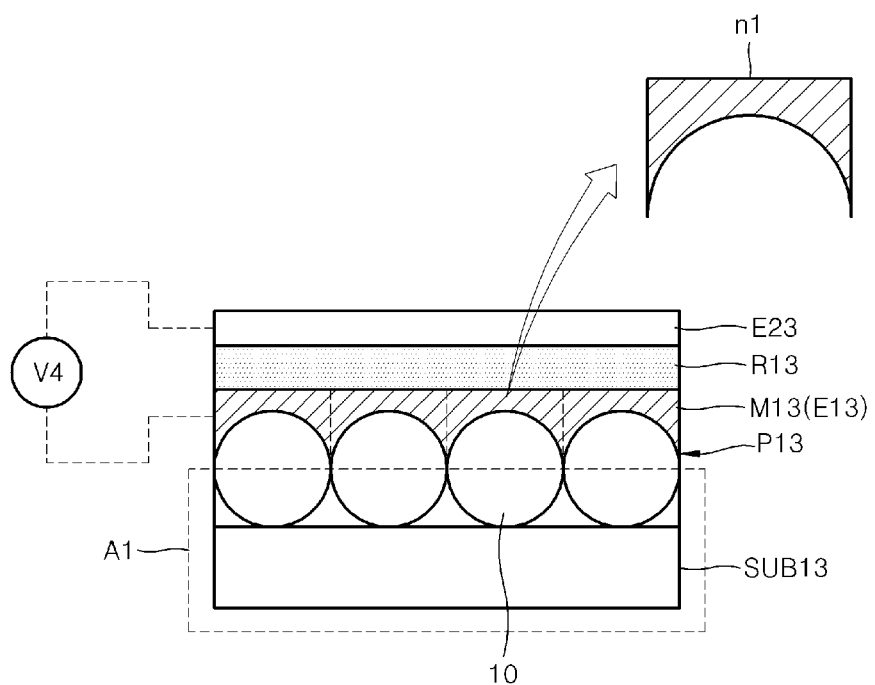
FIG. 11 is a diagram illustrating another example of a light modulator.

FIG. 11 illustrates another example of a light modulator.

Referring to FIG. 11, a nanoparticle layer P13 including a plurality of nanoparticles 10 is disposed on a substrate SUB13. For example, the nanoparticles 10 may be formed of a dielectric material. In this case, a refractive index of the dielectric may be, for example, about 1 to about 2. The nanoparticles 10 may be formed of a material other than the dielectric. A metallic layer M13 is disposed on the nanoparticle layer P13. For example, the metallic layer M13 may be formed of gold (Au), silver (Ag), copper (Cu), aluminum (Al), a combination thereof, and the like. Because the metallic layer M13 is formed on the nanoparticle layer P13, a lower surface of the metallic layer M13 may have an uneven structure. A portion of the metallic layer M13 corresponding to one of the nanoparticles 10 (see a magnified part in FIG. 11) is referred to as "a unit nanostructure n1". In this example, the unit nanostructure n1 has a concave lower surface. In this case, the concave lower surface is a hemispherical surface or a pseudo hemispherical surface. The unit nanostructure n1 may be a "plasmonic nano-antenna". The metallic layer M13 may be a structure in which a plurality of unit nanostructures n1 are continuously arranged.

A refractive index change layer R13 is disposed on the metallic layer M13, and an electrode E23 is disposed on the refractive index change layer R13. The metallic layer M13 itself (or a portion thereof) may be used as a first electrode E13. In this example, the electrode E23 disposed on the refractive index change layer R13 is referred to as a second electrode E23. A voltage applying unit V4 is connected to the refractive index change layer R13 and the second electrode E23. The voltage applying unit V4 may apply a voltage between the metallic layer M13 and the second electrode E23 to change a refractive index of the refractive index change layer R13. A structure of a first region A1 that is indicated by a dashed line in FIG. 11 may not be provided. For example, the structure of the first region A1 may be removed. Although not shown in FIG. 11, a dielectric layer may be disposed between the metallic layer M13 and the refractive index change layer R13 and/or between the refractive index change layer R13 and the second electrode E23.

In FIG. 11, as an example, a diameter of the nanoparticles 10 may be about 200 nm to about 600 nm. A distance from an upper vertex of the nanoparticle 10 to an upper surface of the metallic layer M13, i.e., a thickness of the thinnest part of the metallic layer M13, may be equal to or less than about 20 nm. As another example, a thickness of the refractive index change layer R13 may be about 500 nm to about 100 μm. The voltage applied by the voltage applying unit V4 between the refractive index change layer R13 and the second electrode E23 may be, for example, in a range of several to several hundred V such as about 2V to about 200V. It should be appreciated that the sizes and the thickness of elements and the voltage condition are merely for purposes of example, and may be variously changed.

Figure 12:
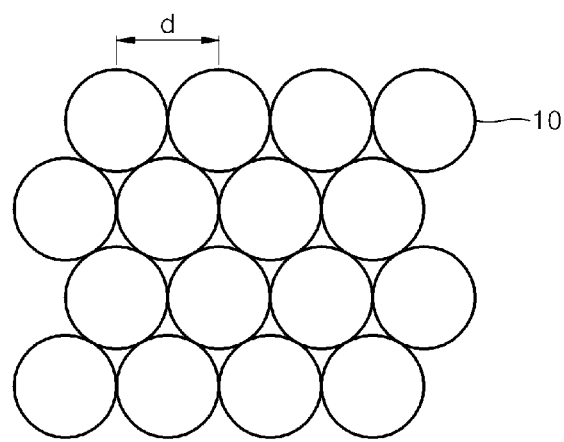
FIG. 12 is a diagram illustrating examples of a plurality of nanoparticles illustrated in FIG. 11.

FIG. 12 illustrates an example of the nanoparticles 10 illustrated in FIG. 11.

Referring to FIG. 12, the nanoparticles 10 have a closely packed structure. For example, a distance d between centers of two neighboring nanoparticles 10 may be equal to or less than $\lambda/2$, equal to or less than $\lambda/3$, and the like. Here, $\lambda$ is a resonance wavelength of the light modulator, i.e., a resonance wavelength of the plasmonic nano-antenna. The structure of FIG. 12 is an example and may be variously changed. For example, the nanoparticles 10 may not have a closely packed structure.

Figure 13:
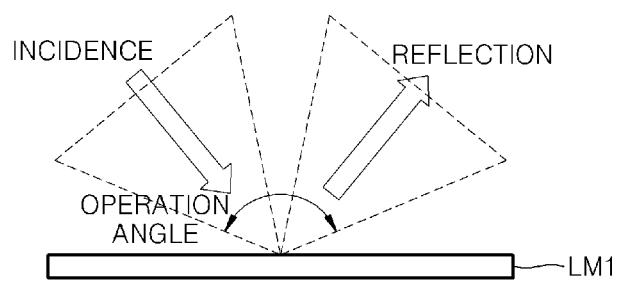
FIG. 13 is a diagram illustrating an example of an incident light modulation method of a light modulator.
Figure 14:
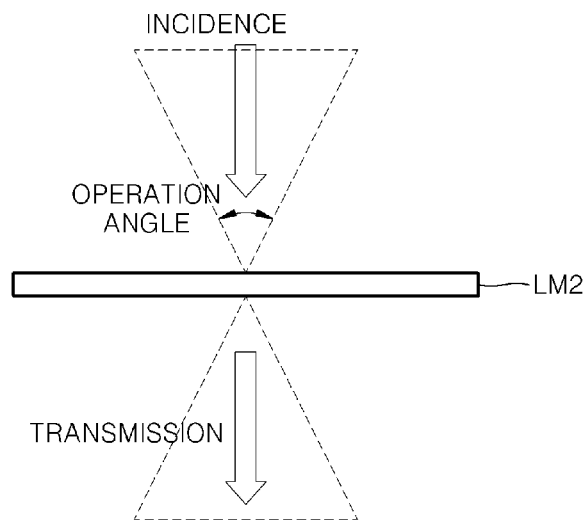
FIG. 14 is a diagram illustrating another example of an incident light modulation method of a light modulator.
Figure 15:
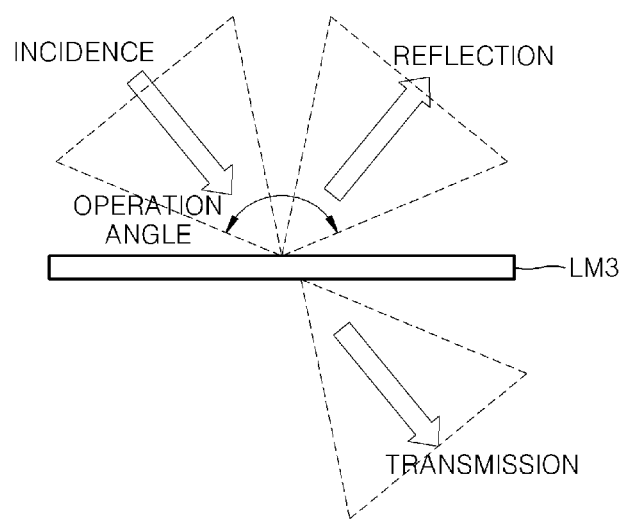
FIG. 15 is a diagram illustrating another example of an incident light modulation method of a light modulator.

According to various examples, the light modulator may be a reflective, transmissive, or transflective type. FIGS. 13 through 15 illustrate examples of modulation methods of an incident light, according to the type of a light modulator.

FIG. 13 illustrates an example in which a light modulator LM1 is a reflective type. Referring to FIG. 13, the light modulator LM1 may reflect or absorb light information incident with various angles and polarizations. The reflected light may be incident on a predetermined detector or an optical system. In this example, reflection and/or absorption characteristics may be modulated according to an on/off state of the light modulator LM1. That is, characteristics of the light (reflected light) incident on the detector or the optical system may vary according to the on/off state of the light modulator LM1.

FIG. 14 illustrates an example in which a light modulator LM2 is a transmissive type. Referring to FIG. 14, the light modulator LM2 may transmit or absorb light information incident with various angles and polarizations. The transmitted light may be incident on a predetermined detector or an optical system. In this example, transmission and/or absorption characteristics may be modulated according to an on/off state of the light modulator LM2. That is, characteristics of the light (transmitted light) incident on the detector or the optical system may vary according to the on/off state of the light modulator LM2.

FIG. 15 illustrates an example in which a light modulator LM3 is a transflective type. Referring to FIG. 15, the light modulator LM3 may reflect a portion of incident light, may transmit another portion of the incident light, and may absorb another portion of the incident light. In this example, reflection, transmission, and/or absorption characteristics may be modulated according to an on/off state of the light modulator LM3.

Figure 16:
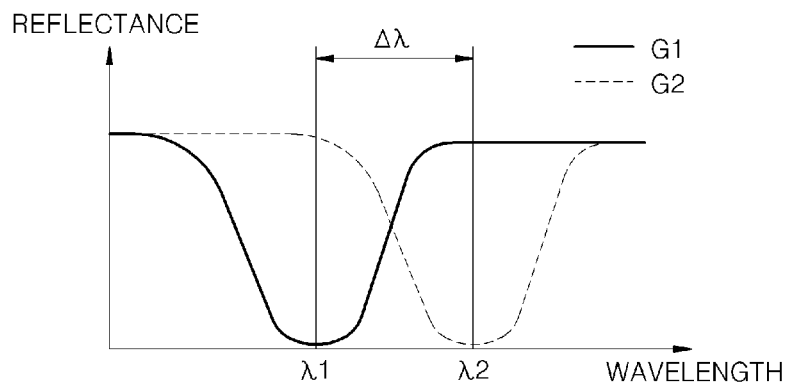
FIG. 16 is a graph illustrating an example of changes in reflectance according to on and off states of a light modulator.

FIG. 16 is a graph illustrating an example of changes in reflectance according to on and off states of a light modulator. In FIG. 16, a first plot G1 illustrates an example in which the light modulator is in the off state, and a second plot G2 illustrates an example in which the light modulator is in the on state.

Referring to FIG. 16, the second plot G2 is located to the right of the first plot G1, which shows that reflection and absorption characteristics are greatly changed if the light modulator is turned on. For example, in the off state, light of a first wavelength $\lambda 1$ is absorbed while light other than the first wavelength $\lambda 1$ is reflected. On the other hand, in the on state, light of a second wavelength $\lambda 2$ is absorbed while light other than the second wavelength $\lambda 2$ is reflected. In this example, the second wavelength $\lambda 2$ is located to the right of the first wavelength $\lambda 1$. If a difference ($\Delta\lambda$) between the first wavelength $\lambda 1$ and the second wavelength $\lambda 2$ is relatively large, a modulation width of the light modulator is relatively large. Accordingly, light of the first wavelength $\lambda 1$ is not reflected and is mostly absorbed in the off state, but is mostly reflected in the on state. As a result, characteristics of reflected light may greatly vary according to the on/off state of the light modulator. For example, a color of the reflected light may vary according to the on/off state of the light modulator.

Meanwhile, if the light modulator is a transmissive type, in the off state, light of a predetermined first wavelength may be absorbed while light other than the first wavelength is transmitted. On the other hand, in the on state, light of a predetermined second wavelength may be absorbed while light other than the second wavelength may be transmitted. Accordingly, characteristics of transmitted light may vary according to the on/off state of the light modulator.

As described herein, reflection, transmission, and/or absorption characteristics of incident light may be changed by changing a refractive index of a refractive index change layer. In doing so, plasmon resonance characteristics of a plasmonic nano-antenna adjacent to the refractive index change layer may be changed. For example, an absorption wavelength, polarization characteristics, and a viewing angle may be variously controlled by controlling a shape and an arrangement of metallic layer patterns used as plasmonic nano-antennas. Further, a light modulator may modulate a phase of incident light. That is, the light modulator may be a light modulator that has a phase modulation function.

Figure 17:
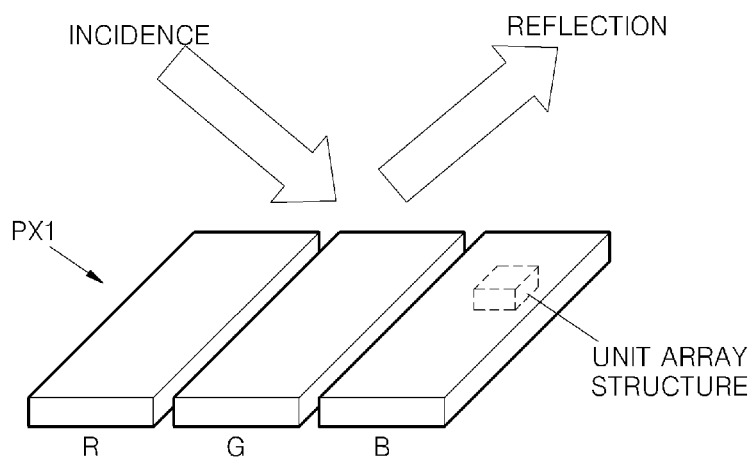
FIG. 17 is a diagram illustrating an example of a reflective color pixel using a light modulator.

FIG. 17 illustrates an example of a reflective color pixel PX1 using a light modulator. As illustrated in FIG. 17, the reflective color pixel PX1 may include a plurality of sub pixels R, G, and B for modulating various colors. The sub pixels R, G, and B may be configured to modulate different colors (red, green, and blue), and may include array structures, for example, that are similar to those illustrated in FIG. 9.

Although FIG. 17 illustrates the reflective color pixel PX1 used in a reflective display device, a light modulator described herein may be used on various purposes in transmissive and transflective display devices in addition to the reflective display device. Also, the light modulator may be used in variously driven display devices as well as a display device driven by a constant voltage. For example, a display device using a light modulator according to various examples herein may be driven by a low power at a high speed.

As another example, if a light modulator is used in a camera, for example, the light modulator may be used as a shutter for allowing or blocking a flow of light of a certain wavelength. For example, the light modulator may be used as a shutter to allow or to block a flow of pulse-type light of an infrared wavelength at a high speed. In this example, the light modulator may be used as a shutter for modulating an optical signal to extract depth information in a three-dimensional (3D) camera based on a time-of-flight method. If the light modulator is used, a solid state shutter driven by a low power at a high speed (e.g., a level of 100 MHz) may be realized.

The examples in which the light modulator is used in a display device and a camera are representatively described above, however, the light modulator may also be used in various optical apparatus other than the display and the camera.

Furthermore, although an example in which a refractive index of a refractive index change layer is changed by an electrical signal is representatively described above, the refractive index of the refractive index change layer may be changed using methods other than the method using the electrical signal. For example, the refractive index of the refractive index change layer may be changed by heat or mechanical strain (contraction/expansion, electro-wetting, etc.). In this case, a structure of an element for changing the refractive index of the refractive index change layer, i.e., a refractive index changing unit, may be different from the above description. In other words, a light modulator according to various examples herein may operate by using a thermal or mechanical modulation method instead of an electrooptic modulation method.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

It would be understood by one of ordinary skill in the art that a structure in which a material of a metallic layer pattern and a material of a dielectric layer contacting the metallic layer pattern are switched (i.e., an inverse structure) is also available. Also, it would be understood by one of ordinary skill in the art that plasmon resonance characteristics of a plasmonic nano-antenna may also be changed due to a change in optical characteristics other than a change in refractive index.

What is claimed is:

1. A light modulator comprising:
a plasmonic nano-antenna comprising a nanostructure;
a refractive index change layer that is disposed adjacent to the plasmonic nano-antenna; and
a refractive index changing unit configured to change a refractive index of the refractive index change layer,
wherein, in response to the refractive index changing unit changing the refractive index of the refractive index change layer, plasmon resonance characteristics of the plasmonic nano-antenna are changed,
the nanostructure is disposed on an upper surface of the refractive index change layer, a dielectric layer is provided on the upper surface of the refractive index change layer to cover an upper surface and a side surface of the nanostructure, and the refractive index change layer is located under the nanostructure and the dielectric layer, and the refractive index change layer is farther from a light incident side of the light modulator than the dielectric layer.

2. The light modulator of claim 1, wherein the refractive index change layer comprises a material that has a refractive index that is capable of being changed by an electrical signal.

3. The light modulator of claim 2, wherein the refractive index change layer comprises an electrooptic material.

4. The light modulator of claim 2, wherein the refractive index change layer comprises an electrically conductive transparent material.

5. The light modulator of claim 2, wherein the refractive index changing unit comprises:
first and second electrodes that are spaced apart from each other and the refractive index change layer intervenes the first and second electrodes; and
a voltage applying unit configured to apply a voltage between the first and second electrodes.

6. The light modulator of claim 5, wherein the refractive index change layer is in contact with the first electrode, and
the plasmonic nano-antenna is disposed between the refractive index change layer and the second electrode.

7. The light modulator of claim 5, wherein at least a portion of the refractive index change layer is used as one of the first or second electrodes.

8. The light modulator of claim 7, wherein at least a portion of the refractive index change layer is used as the first electrode, and
the plasmonic nano-antenna is disposed between the refractive index change layer and the second electrode.

9. The light modulator of claim 8, further comprising a second dielectric layer that is disposed between the refractive index change layer and the plasmonic nano-antenna.

10. The light modulator of claim 5, wherein at least a portion of the plasmonic nano-antenna is one of the first or second electrodes.

11. The light modulator of claim 10, wherein at least a portion of the plasmonic nano-antenna is the first electrode, and
the refractive index change layer is disposed between the plasmonic nano-antenna and the second electrode.

12. The light modulator of claim 1, wherein the plasmonic nano-antenna comprises a metallic layer pattern, and the metallic layer pattern contacts a non-metallic layer.

13. The light modulator of claim 12, wherein the non-metallic layer comprises a dielectric layer.

14. The light modulator of claim 12, wherein the metallic layer pattern comprises a shape of at least one of a circular disc, a cross, a cone, a sphere, a hemisphere, a rice grain, an oval disc, and a rod.

15. The light modulator of claim 12, wherein a lower surface of the metallic layer pattern comprises a concave structure.

16. The light modulator of claim 15, wherein the lower surface of the metallic layer pattern is concaved in the shape of a hemisphere or a pseudo hemisphere.

17. The light modulator of claim 12, wherein a thickness of the metallic layer pattern is equal to or less than $\lambda/5$, where $\lambda$ is a resonance wavelength of the light modulator.

18. The light modulator of claim 12, wherein the plasmonic nano-antenna comprises a plurality of metallic layer patterns that are arranged in a pattern.

19. The light modulator of claim 18, wherein the plurality of metallic layer patterns are spaced apart from each other such that adjacent metallic layer patterns are spaced apart by a distance d.

20. The light modulator of claim 18, wherein the plurality of metallic layer patterns contact each other.

21. The light modulator of claim 18, wherein a distance between centers of two neighboring metallic layer patterns is equal to or less than $\lambda/2$, where $\lambda$ is a resonance wavelength of the light modulator.

22. The light modulator of claim 1, wherein the refractive index change layer is non-metallic, the plasmonic nano-antenna comprises a metallic layer pattern, and the metallic layer pattern contacts the non-metallic refractive index change layer.

23. The light modulator of claim 1, wherein the light modulator is one of a reflective type, a transmissive type, or a transflective type.

24. An optical apparatus comprising the light modulator of claim 1.

25. The optical apparatus of claim 24, wherein the optical apparatus is a camera.

26. The optical apparatus of claim 25, wherein the camera is a three-dimensional (3D) camera that uses the light modulator as a shutter.

27. The optical apparatus of claim 24, wherein the optical apparatus is a display device.

28. The optical apparatus of claim 27, wherein the display device uses the light modulator as a color pixel.

29. The optical apparatus of claim 27, wherein the display device is one of a reflective type, a transmissive type, or a transflective type.

30. A light modulate comprising:
a plasmonic nano-antenna,
a refractive index change layer that is disposed adjacent to the plasmonic nano-antenna; and
a refractive index changing unit configured to change a refractive index of the refractive index change layer,
wherein, in response to the refractive index changing unit changing the refractive index of the refractive index change layer, plasmon resonance characteristics of the plasmonic nano-antenna are changed,
wherein the refractive index change layer comprises a material that has a refractive index that is capable of being changed by an electrical signal,
the refractive index changing unit comprises first and second electrodes that are spaced apart from each other and intervening the refractive index change layer, and a voltage applying unit configured to apply a voltage between the first and second electrodes, and
at least a portion of the refractive index change layer is used as the first electrode, the second electrode is disposed at a side of the refractive index change layer and the second electrode is spaced apart from the refractive index change layer, and the plasmonic nano-antenna is disposed at the other side of the refractive index change layer.

31. The light modulator of claim 30, further comprising a dielectric layer that is disposed between the refractive index change layer and the second electrode.

32. A light modulator comprising:
a nanoparticle layer in which a plurality of nanoparticles are arranged;
a metallic layer disposed on the nanoparticle layer and that has an uneven structure on a lower surface;
a refractive index change layer that is disposed on the metallic layer; and
a refractive index changing unit configured to change a refractive index of the refractive index change layer.

33. The light modulator of claim 32, wherein the metallic layer comprises a unit structure corresponding to one of the nanoparticles, and
a plurality of the unit structures are continuously arranged.

34. The light modulator of claim 33, wherein a distance between centers of two neighboring unit structures is equal to or less than λ/2, where λ is a resonance wavelength of the light modulator.

35. The light modulator of claim 33, wherein a thickness of each of the plurality of unit structures is equal to or less than λ/5, where λ is a resonance wavelength of the light modulator.

36. The light modulator of claim 32, wherein the refractive index changing unit comprises:
first and second electrodes that are spaced apart from each other and intervening the refractive index change layer; and
a voltage applying unit configured to apply a voltage between the first and second electrodes.

37. The light modulator of claim 32, wherein the metallic layer is one of first and second electrodes of the refractive index changing unit, the first and second electrodes are spaced apart from each other and the refractive index change layer intervenes the first and second electrodes, and the refractive index changing unit comprises a voltage applying unit configured to apply a voltage between the first and second electrodes.

38. An optical apparatus comprising the light modulator of claim 32.

39. A light modulator comprising:
a plasmonic nano-antenna;
a refractive index change layer that is disposed adjacent to the plasmonic nano-antenna; and
a refractive index changing unit configured to change a refractive index of the refractive index change layer,
wherein, in response to the refractive index changing unit changing the refractive index of the refractive index change layer, plasmon resonance characteristics of the plasmonic nano-antenna are changed, and
the refractive index change layer comprises an electrical conductive transparent material that includes at least one of indium tin oxide (ITO) and a zinc oxide (ZnO)-based material.

* * * * *